(12) United States Patent
Jugl et al.

(10) Patent No.: US 12,478,735 B2
(45) Date of Patent: Nov. 25, 2025

(54) METHOD AND ELECTRONIC DEVICE FOR ACQUIRING DELIVERY INFORMATION

(71) Applicant: Sanofi, Paris (FR)

(72) Inventors: Michael Jugl, Frankfurt am Main (DE); Stefan Blancke, Frankfurt am Main (DE)

(73) Assignee: Sanofi, Paris (FR)

( * ) Notice: Subject to any disclaimer, the term of this patent is extended or adjusted under 35 U.S.C. 154(b) by 992 days.

(21) Appl. No.: 17/625,920

(22) PCT Filed: Jul. 9, 2020

(86) PCT No.: PCT/EP2020/069369
§ 371 (c)(1),
(2) Date: Jan. 10, 2022

(87) PCT Pub. No.: WO2021/008992
PCT Pub. Date: Jan. 21, 2021

(65) Prior Publication Data
US 2022/0249775 A1   Aug. 11, 2022

(30) Foreign Application Priority Data

Jul. 12, 2019   (EP) .................................. 19305934

(51) Int. Cl.
*A61M 5/20*   (2006.01)
*A61M 5/31*   (2006.01)
*A61M 5/315*   (2006.01)

(52) U.S. Cl.
CPC ............ *A61M 5/20* (2013.01); *A61M 5/3129* (2013.01); *A61M 5/31528* (2013.01);
(Continued)

(58) Field of Classification Search
None
See application file for complete search history.

(56) References Cited

U.S. PATENT DOCUMENTS 7,500,444 B2 *   3/2009   Bonney ................. G06M 1/041
116/311
2011/0276006 A1   11/2011   Matthias et al.
(Continued)

FOREIGN PATENT DOCUMENTS

CN   105813669 A   7/2016
CN   107106785 A   8/2017
(Continued)

OTHER PUBLICATIONS

International Preliminary Report on Patentability in International Appln. No. PCT/EP2020/069369, dated Jan. 27, 2022, 7 pages.
(Continued)

*Primary Examiner* — Manuel A Mendez
(74) *Attorney, Agent, or Firm* — Fish & Richardson P.C.

(57) ABSTRACT

The present disclosure relates to an information acquisition system, an electronic device and to a method of acquiring delivery information of a drug delivery device configured for delivery of a dose of a medicament. The drug delivery device includes a housing and a mechanically implemented post-dispensing indicator. A configuration of the post-dispensing indicator visible from outside the drug delivery device is indicative of a size of a dose previously delivered by the drug delivery device. An image of the post-dispensing indicator is captured after delivery of the dose. —The image is processed and the configuration of the post-dispensing indicator is recognized in the image. A dose size is derived from the recognized configuration of the post-dispensing indicator. The dose size is assigned with a timestamp, storing the dose size with the timestamp in a storage.

18 Claims, 4 Drawing Sheets

(52) U.S. Cl.
CPC .... *A61M 5/31533* (2013.01); *A61M 5/31541* (2013.01); *A61M 5/31563* (2013.01); *A61M 5/31568* (2013.01); *A61M 5/31576* (2013.01)

(56) References Cited

U.S. PATENT DOCUMENTS

| | | |
|---|---|---|
| 2014/0249410 A1 | 9/2014 | Uber, III et al. |
| 2015/0202375 A1 | 7/2015 | Schabbach et al. |
| 2016/0317751 A1 | 11/2016 | Andersen |
| 2017/0032211 A1 | 2/2017 | Allerdings et al. |
| 2017/0316158 A1 | 11/2017 | Klemm et al. |
| 2017/0368263 A1 | 12/2017 | Ploch |
| 2018/0268236 A1 | 9/2018 | Klemm |
| 2023/0360790 A1 | 11/2023 | Burkholz et al. |

FOREIGN PATENT DOCUMENTS

| | | |
|---|---|---|
| CN | 109310828 A | 2/2019 |
| CN | 109562227 A | 4/2019 |
| CN | 109689135 A | 4/2019 |
| CN | 109843357 A | 6/2019 |
| CN | 109939293 A | 6/2019 |
| DE | 2017081 | 10/1970 |
| GB | 1290594 | 9/1972 |
| JP | 2015-123205 A | 7/2015 |
| JP | 2015-528318 A | 9/2015 |
| JP | 2016-047145 A | 4/2016 |
| JP | 2017-504388 A | 2/2017 |
| JP | 2017-513086 A | 5/2017 |
| JP | 2018-501911 A | 1/2018 |
| JP | 2018-020146 A | 2/2018 |
| WO | WO-2008085607 A2 * | 7/2008 ............ A61J 7/0481 |
| WO | WO 2013/120777 A1 | 8/2013 |
| WO | WO 2014/023763 A1 | 2/2014 |
| WO | WO 2015/091818 | 6/2015 |
| WO | WO 2015/116794 A1 | 8/2015 |
| WO | WO 2015/185687 | 12/2015 |
| WO | WO 2016/113348 A1 | 7/2016 |
| WO | WO 2017/147202 | 8/2017 |
| WO | WO 2017/148857 A1 | 9/2017 |
| WO | WO 2017/207495 A1 | 12/2017 |
| WO | WO 2018/077880 A1 | 5/2018 |
| WO | WO 2018/078161 | 5/2018 |
| WO | WO 2018/104292 A1 | 6/2018 |
| WO | WO 2018/108855 A1 | 6/2018 |
| WO | WO 2018/140341 A1 | 8/2018 |
| WO | WO 2019/102027 | 5/2019 |
| WO | WO 2019/129618 A1 | 7/2019 |

OTHER PUBLICATIONS

International Search Report and Written Opinion in International Appln. No. PCT/EP2020/069369, dated Oct. 26, 2020, 9 pages.

* cited by examiner

METHOD AND ELECTRONIC DEVICE FOR ACQUIRING DELIVERY INFORMATION

CROSS REFERENCE TO RELATED APPLICATIONS

The present application is the national stage entry of International Patent Application No. PCT/EP2020/069369, filed on Jul. 9, 2020, and claims priority to Application No. EP 19305934.2, filed on Jul. 12, 2019, the disclosures of which are incorporated herein by reference.

TECHNICAL FIELD

The present disclosure relates to the field of monitoring repeated use of drug delivery devices, e.g. injection devices or pen-type injectors. The disclosure further relates to the acquisition of a medication history during repeated use of a medical device. The disclosure particularly relates to a method of acquiring delivery information of a drug delivery device and to an electronic device for acquiring such delivery information. In another aspect the disclosure relates to an information acquisition system and to a computer program for acquiring delivery information of a drug delivery device. In a further aspect the disclosure relates to a drug delivery device particularly configured for acquiring delivery information through use of an electronic device.

BACKGROUND

Drug delivery devices for setting and dispensing a single dose or multiple doses of a liquid medicament are as such well-known in the art. Generally, such devices have substantially a similar purpose as that of an ordinary syringe.

Drug delivery devices, such as injectors, e.g. pen-type injectors have to meet a number of user-specific requirements. For instance, with patient's suffering chronic diseases, such as diabetes, the patient may be physically infirm and may also have impaired vision. Suitable drug delivery devices especially intended for home medication therefore need to be robust in construction and should be easy to use. Furthermore, manipulation and general handling of the device and its components should be intelligible and easy understandable. Such injection devices can provide setting and subsequent dispensing of a dose of a medicament of variable size. Moreover, a dose setting as well as a dose dispensing procedure must be easy to operate and has to be unambiguous.

Some devices comprise a housing or a holder, e.g. a cartridge holder configured to receive a medicament container, e.g. in form of a cartridge at least partially filled with the medicament to be expelled. The device further comprises a drive mechanism, usually having a displaceable plunger or piston rod to operably engage with a bung or piston of the medicament container or cartridge. By means of the drive mechanism and the piston rod, the bung or piston of the cartridge is displaceable in a distal direction or dispensing direction and may be therefore configured to expel a predefined amount of the medicament via a piercing assembly, e.g. in form of an injection needle, connected to or releasably connectable with an outlet end of the medicament container.

With reusable drug delivery devices an empty cartridge is replaceable by a filled one. In contrast to that, drug delivery devices of disposable type are to be entirely discarded when the medicament in the cartridge has been dispensed or used-up.

In general, medicament containers, such as cartridges, carpules or pre-filled syringes typically comprise a barrel of substantially tubular shape having an outlet at a distal end and having a bung or a piston moveably arranged inside the barrel. The bung or piston seals the barrel towards a proximal end opposite to the distal outlet end. By displacing the bung towards the distal end a predefined amount of the medicament, i.e. a dose of the medicament, can be expelled through the outlet of the cartridge.

Drug delivery devices intended and configured for home medication provide the benefit that the patient himself is enabled to administer doses of the medicament of variable size at regular or at different times. Typically, patients have to comply with a prescribed or individual medication schedule. For instance, a certain amount of a dose of the medicament can be administered in the morning and another amount of the medicament, hence a different dose can be administered in the evening. It is desirable to supervise or to monitor at least the repeated administering of doses of the medicament. Purely mechanically implemented drug delivery devices, such as purely mechanically implemented injection pens, e.g. manufactured and provided as a disposable device are per se void of any electronic components that could be used to monitor or to log the administering of a medicament over time.

There have been suggested numerous add-on devices that are intended to be manually attached to such drug delivery devices in order to monitor and to log operations of the drug delivery device. Such add-on devices modify the outer design and appearance of the drug delivery device. Attachment of separate add-on devices to drug delivery devices may have an impact on the outer appearance, the design and the general handling of the drug delivery device.

Moreover, some drug delivery devices require storage in a refrigerated area. Some patients may be encouraged to keep the add-on device out of such areas. The patient may thus intend to repeatedly mount and dismount the add-on device to and from the drug delivery device. For the proper function of an add-on device, the correct assembly and attachment to the drug delivery device may be rather crucial. These demands and requirements may be therefore detrimental to an intuitive and straightforward use of the drug delivery device.

SUMMARY

This disclosure relates to an improved method of acquiring delivery information of a drug delivery device which method is easy to implement and which method comes along with a high degree of user acceptance. The method of acquiring delivery information can avoid a manual assembly or mechanical engagement of the drug delivery device with a particularly configured add-on device. Rather, the method can provide acquisition of dose delivery information from a drug delivery device without establishing a mechanical engagement with a separate add-on device. The method can be reliable and failure safe. The method can be implementable with minor hardware upgrades or minor modifications to existing devices.

This disclosure further relates to an improved electronic device for acquiring delivery information and to provide a respective computer program as well as an information acquisition system for acquiring delivery information. It is another aim to provide an improved drug delivery device, in particular a pen-type injector that is particularly configured for implementation of the method of acquiring delivery information.

In one aspect there is provided a method of acquiring delivery information of a drug delivery device. The drug delivery device, e.g. implemented as an injection device or as a pen-type injector, is configured for delivery, e.g. for expelling of a dose of a medicament. The drug delivery device comprises a housing and a mechanically implemented post-dispensing indicator. A configuration of the post-dispensing indicator is visible from outside the drug delivery device. The configuration of the post-dispensing indicator is indicative of a size of a dose previously delivered by the drug delivery device. Insofar, the method is applicable to a particular type of drug delivery device being equipped with a post-dispensing indicator. The post-dispensing indicator provides a kind of a visible echo signal being indicative of a single, typically of a last single dose of the medicament that has been dispensed or delivered by the drug delivery device.

The post-dispensing indicator is a mechanically implemented indicator. This allows implementing the drug delivery device all mechanically, which is beneficial for disposable drug delivery devices, such as a disposable injection pen.

The post-dispensing indicator may be operable to visualize or to illustrate the dose size of a dose delivery action that has been executed last. The post-dispensing indicator is hence indicative of the size of an individual dose that has been previously delivered by the drug delivery device. The previously delivered dose indicated or illustrated by the post-dispensing indicator is illustrative of the last dose that has been set and delivered or expelled by the drug delivery device.

The method of acquiring delivery information comprises capturing of an image of the post-dispensing indicator after delivery of the dose. The delivery of the dose does not belong to the method. The method may start after delivery of the dose took place, hence when the process of dose delivery has terminated. Capturing of an image of the post-dispensing indicator may take place at a certain time after dose delivery. In typical embodiments the image is captured directly after or with the termination of the dose delivery process. At this point of time the post-dispensing indicator is illustrative of the size of the individual dose that has been previously delivered by the drug delivery device.

The method further comprises the step of processing of the captured image and recognizing the configuration of the post-dispensing indicator in the image. Based on the recognition of the configuration of the post-dispensing indicator a dose size is derived from the recognized configuration of the post-dispensing indicator. The dose size derived from the image is then assigned with a timestamp and the dose size is stored with the timestamp in a storage. Typically, the dose size and the timestamp are together stored in the storage. The storage may comprise an electronic storage, e.g. a readable and writable storage in an electronic device. The storage may comprise an electrically erasable programmable read-only memory (EEPROM).

Capturing of the image may autonomously trigger the processing of the image and recognizing of the configuration of the post-dispensing indicator in the image. Capturing of the image may also autonomously trigger deriving of dose size information from the recognized configuration and assigning the dose size with a timestamp as well as storing the dose size with the timestamp in the storage.

In this way a user may only have to initiate capturing of an image of the post-dispensing indicator after delivery of the dose. Processing of the image, deriving of dose size information from the image-based recognized configuration of the post-dispensing indicator, assigning of the dose size with a timestamp and storing of the dose size together with the corresponding timestamp in a storage may be conducted rather autonomously.

The numerous process steps may be executed by an electronic device, in particular by a portable electronic device at least equipped with a camera to capture the image. The numerous method steps may be all be executed and implemented in one and the same electronic device. For this the electronic device also comprises a processor for processing of the image. The electronic device may further comprises at least a clock generator to provide a timestamp. The device is further equipped with an electronic storage to store the dose size together with the timestamp.

Alternatively, the method can be conducted and executed with numerous electronic devices configured to communicate with each other. Here, a first electronic device is equipped with a camera to capture the image. The first electronic device may be further equipped with a first communication interface to communicate with a second electronic device. Processing of the image, recognizing the configuration of the post-dispensing indicator in the image, deriving of the dose size from the recognized configuration, assigning the dose size with the timestamp and storing the dose size with the timestamp may be executed or conducted exclusively by the second electronic device. The first and the second electronic device may communicate via a network, such as the internet.

The first electronic device is typically used by the patient and is typically implemented as a portable electronic device. The second electronic device may be a portable or stationary electronic device. It may comprise a database or may be part of a computer center or data center.

The implementation of the method of acquiring delivery information is particularly based on image processing in combination with optical character recognition or optical pattern recognition provided by a software or computer program implemented or deployed in the first and/or second electronic device.

Insofar the method of acquiring delivery information of a drug delivery device provides the benefit that for acquisition of delivery-related information establishing of a mechanical connection between the drug delivery device and an add-on device is by no way necessary. The method can easily be conducted and executed by a smartphone, by a tablet or even by a smart watch to which the user has universal access.

Moreover, the mechanically implemented post-dispensing indicator provides the benefit, that from the capturing of a single image after delivery of the dose the entire delivery information of the previous delivery process can be acquired. It is hence neither necessary nor intended to capture several images of the drug delivery device and to derive the delivery information through a comparison of such images.

According to a further example the post-dispensing indicator of the drug delivery device comprises an indicator member that is movable along a track. Here, a position of the indicator member along the track is indicative of the size of the dose previously delivered by the drug delivery device. The step of recognizing the configuration of the post-dispensing indicator includes recognizing of the position of the indicator member along the track in the image.

The track may comprises a rather straight-shaped and elongated track. With other examples the track may comprise a helically wound track or the track is a circular-shaped track. The track and the position of the indicator member along the track is visible from outside the drug delivery device. The track may be provided on the housing or may be integrated into the housing of the drug delivery device. With some example the track may be located inside the housing but is visible from outside the housing. This is possible when at least a portion of the housing covering the track is translucent or transparent at least for the operating optical wavelength of the camera of the electronic device configured to capture the image of the post-dispensing indicator.

The indicator member may be guided along, in or on the track. In this way a rather forced and guided movement of the indicator member relative to the housing of the drug delivery device can be provided. Such a guided movement of the indicator member along the track is of particular benefit to quantitatively determine the position of the indicator member along the track or relative to the track, e.g. relative to an end or relative to opposite ends of the track.

According to a further example one of the track and the indicator member comprises a first scale. The other one of the track and the indicator member comprises a pointer or a second scale. The pointer or the second scale cooperates with the first scale. Recognizing of the configuration of the post-dispensing indicator includes recognizing of the position of the pointer or of the second scale along or relative to the first scale in the captured image.

Providing of a first scale along the elongation or slope of the track is particularly useful to determine the position of the indicator member along the track. Typically, a free end of the indicator member or a dedicated portion of the indicator member may be provided with the pointer, typically pointing towards the first scale extending along the track. The position of the pointer relative to the first scale is easily recognizable in the image and may therefore be easily used to determine the position of the pointer and hence of the indicator member relative to the first scale and hence relative to the track. The first scale may typically comprise a number of steps, e.g. provided with numbers or with respective dose size indicating symbols. The numerous steps of the scale may be arranged equidistantly along the elongation of the track.

The second scale may also comprise numerous scale steps. In typical examples the number of steps of the second scale per unit length along the second scale may differ from the number of steps per unit length of the first scale. In this way, the first and the second scale may provide a nonius-type scale. Typically the number of steps of the second scale differs by one step from the number of steps of the first scale. Both, the first scale and the second scale may comprise equidistantly arranged steps along the length of the scales.

When implementing the first scale and the second scale to form a nonius-type combined scale the position of the indicator member along the track can be determined on the basis of the captured image with a comparatively high resolution. Here, a comparatively small or short movement or displacement of the indicator member along the track can be precisely determined by the position of the second scale relative to the position of the first scale. In this way even a comparatively large dose size can be represented by a comparatively short displacement of the indicator member along the track. This enables and provides a rather compact design of the mechanically implemented post-dispensing indicator.

According to a further example one of the track and the indicator member comprises a visual code. The visual code is typically encoded along the track. Recognizing the configuration of the post-dispensing indicator includes recognizing of at least a portion of the visual code in the captured image.

The visual code may comprise a gray code, e.g. a two bit, three bit, four bit, five bit, six bit, seven bit or eight bit gray code which is encoded along the elongation of the track. The visual code may comprise a digital code. A digital code on one of the track and the indicator member is particularly suitable for digital image processing and processor-based recognition of the configuration of the post-dispensing indicator.

According to a further example the visual code is provided on an outside facing surface of at least one of the track and the indicator member. As the indicator member is moved relative or along the track the visual code is at least partially covered or revealed. The size of the visual code recognizable in the captured image may be thus indicative of the degree or length of a movement of the indicator member relative to the track.

According to a further example the visual code is successively covered or is successively revealed as the indicator member is moved along the track. A visible length or size of the code along the track is hence indicative of the size of the dose previously delivered. Recognizing the configuration of the post-dispensing indicator includes recognizing or determining of the visible length or visible size of the code in the captured image.

With some examples the track is provided with the visual code. The visual code is encoded along the elongation or length of the track. The indicator member comprises an opaque slider configured to cover that portion of the track that is provided with the visual code. As the indicator member moves along the track, e.g. in a dose size incrementing direction a visual portion of the visual code that is not covered by the indicator member either increases or decreases. The size or length of the uncovered or revealed portion of the visual code is hence directly indicative of the position of the indicator member along the track.

With another example it is the indicator member that is provided with the visual code along the elongation or extension of the track. Moreover, the indicator member may only be viewable or discernible from outside the drug delivery device as it moves along the track. In an initial configuration, e.g. in a zero dose configuration, for instance after a reset of the mechanically implemented post-dispensing indicator the indicator member may not be visible at all on the outside of the drug delivery device. It is only during or after delivery of a dose that the indicator member moves along the track or enters the track, e.g. thereby protruding from a cover of the housing of the drug delivery device. With such examples it may be the indicator member that is exclusively provided with a visual code. Here, only that portion of the indicator member that is revealed from a cover of the housing is indicative of the size of the dose previously delivered. Accordingly, only the visible length of the visual code on a surface or outside portion of the indicator member is indicative of the size of the dose.

According to another example the housing comprises a visible pattern overlapping with the post-dispensing indicator or being located adjacent to the post-dispensing indicator. Processing of the image or recognizing the configuration of the post-dispensing indicator includes compensating of a perspective distortion of the image on the basis of the visible pattern in the image. The visible pattern may comprise a known geometry and/or size. This known geometry or size is also present to the image processing device, e.g. to a processor of an electronic device configured to execute the present method of delivery information acquisition. Since the image may be captured from varying and different perspectives the visible pattern provides and enables calibration as well as a compensation of a perspective distortion of the image.

The processor, in particular an image processor of an electronic device is hence capable to resize or to recalculate at least one of the size or visual illustration of the configuration of the post-dispensing indicator in the image. Moreover, the entire image may be resized or recalculated on the basis of the visible pattern. Of course, the processing of the image includes a recognition of the visible pattern on the basis of which a resizing or recalculation of the captured image takes place.

According to a further example the drug delivery device comprises a dosage window configured to visualize dose indicia or dose numbers being indicative of a size of a dose actually set. Processing of the image or recognizing the configuration of the post-dispensing indicator includes recognizing of dose indicia or dose indicating numbers in the image. In this way, the actual dose setting state of the drug delivery device can be taken into account for the image acquisition or image processing. In this way, situations in which a dose that has been set but has not yet been completely delivered can be recognized thus disabling at least one of processing of the image or recognizing the configuration of the post-dispensing indicator in the captured image.

Image processing of the dosage window and the dose indicia displayed therein in addition to image processing of the post-dispensing indicator helps to improve patient safety and to counteract incorrect use of the electronic device for acquisition of delivery information.

According to a further example recognizing the configuration of the post-dispensing indicator in the image is deactivated as long as the dose indicia recognized in the image do not match with a predefined dose indicium. A predefined dose indicium may be a zero dose configuration, hence a configuration or situation in which the number zero is displayed or visualized in the dosage window of the drug delivery device. This may be a clear and unequivocal indication for that a dose delivery process has terminated. The dose indicia or dose numbers may be provided or printed on an outside surface of a scale drum rotationally supported in the housing of the drug delivery device.

During setting of a dose the scale drum is typically subject to a rotation along a dose increasing direction. During dose delivery or dose dispensing the scale drum is subject to an oppositely directed rotational motion, e.g. along a dose decrementing direction. After completion of a dose delivery process a zero dose configuration of the drug delivery device is discernible at the dosage window. Typically, a number zero or some other symbol representing a zero dose configuration may show up in the dosage window. This zero dose configuration may be used as the predefined dose indicium. As long as such a zero dose configuration is not detectable or recognizable in the captured image at least one of capturing of an image of the post-dispensing indicator, processing of the image and recognizing the configuration of the post-dispensing indicator on the basis of the captured image is deactivated.

Recognizing and evaluating the dose indicia of the dosage window and recognizing of the post-dispensing indicator may be based on only one and the same image. Recognizing or evaluating the dose indicia of the dosage window in the image may also be based on a separate image, e.g. a second image that has to be captured before a first image is captured covering the post-dispensing indicator. In case that two images have to be acquired separately for recognizing or evaluating the dosage window and the post-dispensing indicator it may be required that a time interval between acquisition of the first image and acquisition of the second image is below a predefined minimum. If the predefined minimum, e.g. a few seconds, but typically less than ten seconds are exceeded capturing of another image illustrating the dosage window may be required.

According to another aspect the disclosure further relates to an electronic device for acquiring delivery information of a drug delivery device. The drug delivery device is configured for delivery of a dose of a medicament. The drug delivery device comprises a mechanically implemented post-dispensing indicator. The post-dispensing indicator is reconfigurable. A configuration or condition of the post-dispensing indicator is visible from outside the drug delivery device. The configuration is indicative of a size of a dose previously delivered or dispensed by the drug delivery device.

The electronic device comprises a camera for capturing of an image of the post-dispensing indicator of the drug delivery device. The electronic device further comprises a processor. The processor is operable to process the captured image and is further operable to recognize the configuration of the post-dispensing indicator in the captured image. The processor is further operable to derive a dose size from the recognized configuration of the post-dispensing indicator. Moreover, the processor is configured to assign the dose size derived from the recognized configuration with a timestamp and is further operable to store the dose size with the timestamp or together with the timestamp in a storage, typically in an electronic storage.

The electronic device is particularly configured to execute the above-described method of acquiring delivery information of a drug delivery device. Insofar the steps, features and benefits as described above in connection with the method of acquiring delivery information equally applies to the electronic device, in particular to the processor of the electronic device; and vice versa. The electronic device typically comprises a portable electronic device. The electronic device is typically implemented or configured as a portable electronic device. The electronic device is typically implemented or comprises a smartphone, a tablet computer or a smart watch.

With further examples the electronic device also comprises a display configured to reproduce or to illustrate the captured image of the post-dispensing indicator. With further examples the electronic device comprises a communication interface, typically a wireless transceiver for exchanging digital data with a further electronic device or with a database, e.g. via a communication network. With further examples the electronic device also comprises an input, such as a button or dial. The input may also be emulated or simulated on a touch-sensitive display of the electronic device. The input is operably connected to the processor. Via the input user commands can be received and processed. The input is at least configured to trigger capturing of an image and/or to trigger at least one of the image processing or configuration recognition.

Typically, the electronic device comprises a clock generator. The clock generator is operable to provide a timestamp. The clock generator is operably connected to the processor. With some examples the clock generator is integrated into the processor or into an integrated electronic circuit including at least the processor, the storage and the clock generator.

With another example the electronic device comprises a camera, a processor and a communication interface. Optionally, the electronic device further comprises a storage operably connected to the processor. With this example the processor functionality may be limited to receiving data or signals from the camera and transmitting the data or signals received from the camera to the communication interface for transmitting the camera signals to an external electronic device. Image processing and configuration recognition on the basis of the image may then be conducted by a further electronic device, e.g. by a data center connectable to the electronic device via a communication network. The internal storage of the electronic device may be configured to buffer signals or data acquired by the camera.

According to another aspect the disclosure also relates to a computer program that is adapted to execute the above described method when implemented in a processor of an electronic device. The computer program comprises computer program means for capturing of an image of the post-dispensing indicator after delivery of the dose, for processing of the image and recognizing the configuration of the post-dispensing indicator in the image, for deriving of a dose size from the recognized configuration of the post-dispensing indicator, for assigning the dose size with a timestamp and for storing the dose size with the timestamp or together with the timestamp in a storage. The computer program may be implemented in a processor of a portable electronic device. It may be implemented in the processor of a single or standalone operating electronic device. The storage of the electronic device is then capable to acquire a dosing history being at least indicative of the size of a dose delivered and the respective date or time when the dose has been delivered or dispensed. Of course, the data successively acquired in the storage is transmittable to further electronic devices via the communication interface. The data in the storage can be further processed or evaluated in order to provide information to a caregiver, which information being indicative of the patient's compliance with a prescribed medication schedule or treatment schedule.

With some examples the computer program is configured to be implemented in a distributed hardware environment. Here, some of the program means may be implemented by a processor of a portable electronic device, hence a first electronic device. Some other of the computer program means, e.g. at least one of image processing, configuration recognition, deriving of a dose size, assigning the dose size with a timestamp and/or storing of the dose size with the timestamp in a storage may be conducted or implemented in a further, hence a second electronic device connectable in a data transmitting manner to the first electronic device.

Generally, the computer program is configured to execute the above-described method. Insofar any features, benefits and effects as described above in connection with the method of acquiring delivery information of a drug delivery device equally apply to the computer program; and vice versa.

In another aspect the disclosure relates to an information acquisition system for acquiring delivery information of the drug delivery device. The system comprises a drug delivery device configured for delivery of a dose of a medicament. The drug delivery device comprises a housing and a mechanically implemented post-dispensing indicator. A configuration of the post-dispensing indicator is visible from outside the drug delivery device. The configuration of the post-dispensing indicator is indicative of a size of a dose previously delivered by the drug delivery device. The information acquisition system further comprises an electronic device as described above.

In one example the electronic device comprises a camera for capturing of an image of the post-dispensing indicator. The electronic device further comprises a processor operable to process the image and being further operable to recognize the configuration of the post-dispensing indicator in the image. The processor is further operable to derive a dose size from the recognized configuration of the post-dispensing indicator and the processor is further configured to assign the dose size with a timestamp and to store the dose size with the timestamp in a storage.

In another example the information acquisition system comprises a first electronic device comprising a camera for capturing of an image of the post-dispensing indicator of the drug delivery device. The information acquisition system further comprises a processor as well as a communication interface. Here, the processor may be limited to receive data or electronic signals from the camera and to transmit the respective signals or data to the second electronic device via the communication interface, typically via a communication network. Here, the second electronic device, which may be located in a remote area, comprises a processor operable to process the image and to recognize the configuration of the post-dispensing indicator in the image. The processor of the second electronic device is further operable to derive a dose size from the recognized configuration of the post-dispensing indicator and is further operable to assign the dose size with a timestamp and to store the dose size with the timestamp in a storage of the second electronic device.

With another example of the system the post-dispensing indicator comprises an indicator member movable along a track. A position of the indicator member along the track is indicative of the size of the dose previously delivered. The processor of the electronic device is operable to recognize the position of the indicator member along the track in the image. In this way the processor may provide an automated determination or acquisition of a size of a dose that has been dispensed or delivered by the drug delivery device. The indicator member being movable along the track provides an unequivocal indication of the size of the dose that is readable or recognizable by image recognition routines implemented or deployed in the processor of the electronic device.

With some examples the drug delivery device comprises an injection device. The injection device may be implemented as a pen-type injector. The drug delivery device typically provides setting and delivery of doses of variable size. The size of the dose may be selectable or settable by a user of the device.

With other examples the drug delivery device comprises an infusion device or a pump. With other examples the drug delivery device comprises an inhaler.

According to a further example one of the track and the indicator member comprises a first scale. The other one of the track and the indicator member comprises a pointer or a second scale. The pointer or the second scale is configured to cooperate with the first scale. The processor of the electronic device is further operable to recognize the position of the pointer or to recognize the position of the second scale along the first scale and hence relative to the first scale in the captured image.

Generally, the information acquisition system is implemented to execute and/or to conduct the above described method of acquiring delivery information of a drug delivery device. Insofar any features, effects and benefits as described above in connection with the method of acquiring delivery information equally apply to the information acquisition system; and vice versa.

In still another aspect the disclosure relates to a drug delivery device configured for delivery of a dose of a medicament. The drug delivery device comprises a housing configured to accommodate a medicament container. The device further comprises a drive mechanism configured to operably engage with the medicament container to deliver the dose of the medicament. The device further comprises a mechanically implemented post-dispensing indicator. The post-dispensing indicator comprises an indicator member that is movable along a track. A position of the indicator member along the track is indicative of the size of the dose previously delivered by the drug delivery device, typically by its drive mechanism.

In one example the track comprises a first scale and the indicator member comprises a second scale cooperating with the first scale. First and second scales may constitute a nonius-type combined scale and may thus comprise a first number of discrete steps and a second number of discrete steps, respectively. The first number of discrete steps per unit length is different than the second number of discrete steps per unit length along the track.

With another example one of the track and the indicator member comprises a visual code encoded along the track. The entirety or a major portion of the track may be provided with the visual code and the indicator member may be configured to cover the code as it moves along the track. The indicator member may comprise a slider sliding along the track. For instance, the track is an elongated track extending along an elongation of the housing of the drug delivery device. With other examples and wherein one of the track and the indicator member comprises a visual code it is the indicator member that carries the visual code.

Here, only that portion of the indicator member running along the track or being located on the track is visible from outside the drug delivery device. The housing of the drug delivery device may comprise an opaque cover portion covering the indicator member or at least that portion of the indicator member that is located outside or offset from the track. Hence, in an initial or zero dose configuration the indicator member may be located offset of the track or it may be located adjacent to the track.

During or after delivery of a non-zero dose of the medicament the indicator member moves along the track for a distance that correlates with the size of the dose. The displacement of the indicator member along the track may be identical with a length or portion of the indicator that is revealed or protrudes from the cover and which length or portion covers the track. Hence, in an initial or in a zero dose configuration one end of the elongated indicator member is located adjacent to one end of the track. Depending on the size of the previously delivered dose the indicator member moves along the track and covers a respective portion of the track. Since the track is visible from outside the drug delivery device only that portion of the indicator member that enters or extends along the track is visible from outside. In a zero dose configuration one end of the indicator member is located offset and adjacent to the track. In a maximum dose configuration, hence when a maximum available dose has been delivered the end of the indicator member is adjacent to or overlaps with an opposite end of the track.

With another example and when in a zero dose configuration the indicator member entirely covers the track. As a dose of a particular size has been delivered the indicator member moves along the track and reveals the respective track portion. Here and corresponding with the size of the dose the degree of overlapping between the indicator member and the track constantly or successively decreases.

The drug delivery device may be implemented as an injection device, in particular as a handheld pen-type injector. With other examples the drug delivery device is implemented as an inhaler. The drug delivery device may belong to the above mentioned information acquisition system. Moreover, the drug delivery device is particularly suitable for use with the above-described method of acquiring delivery information of a drug delivery device. Insofar, any of the above mentioned features, benefits and effects that have been described for the method, the electronic device, the computer program and the information acquisition system equally apply to the drug delivery device; and vice versa.

According to a further example the drug delivery device comprises a medicament container. The medicament container contains a medicament and is arranged inside the housing. The drug delivery device may be a prefilled drug delivery device, wherein the medicament container containing the medicament is preassembled inside the housing upon delivery or commercial distribution to customers or patients. The medicament may be an injectable medicament. The medicament may be a liquid medicament.

Generally, a scope of the present disclosure is defined by the content of the claims. The injection device is not limited to specific embodiments or examples but comprises any combination of elements of different embodiments or examples. Insofar, the present disclosure covers any combination of claims and any technically feasible combination of the features disclosed in connection with different examples or embodiments.

In the present context the term 'distal' or 'distal end' relates to an end of the injection device that faces towards an injection site of a person or of an animal. The term 'proximal' or 'proximal end' relates to an opposite end of the injection device, which is furthest away from an injection site of a person or of an animal.

The injection device may comprise a cartridge containing a liquid drug or medicament. In instances, by pressing the injection button a portion thereof may be expelled from the cartridge according to the dialed or pre-set amount. The terms "drug" and "medicament", may refer to a pharmaceutical formulation containing at least one pharmaceutically active compound. More details on particular pharmaceutical formulations may be taken from the disclosure of the co-pending application PCT/EP2018/082640, which, to this extent, shall be included herein by reference.

It will be further apparent to those skilled in the art that various modifications and variations can be made to the present disclosure without departing from the scope of the disclosure. Further, it is to be noted, that any reference numerals used in the appended claims are not to be construed as limiting the scope of the disclosure.

BRIEF DESCRIPTION OF THE FIGURES

In the following, numerous examples of the injection device comprising a filling level indicator will be described in greater detail by making reference to the drawings, in which.

DETAILED DESCRIPTION

Figure 1:
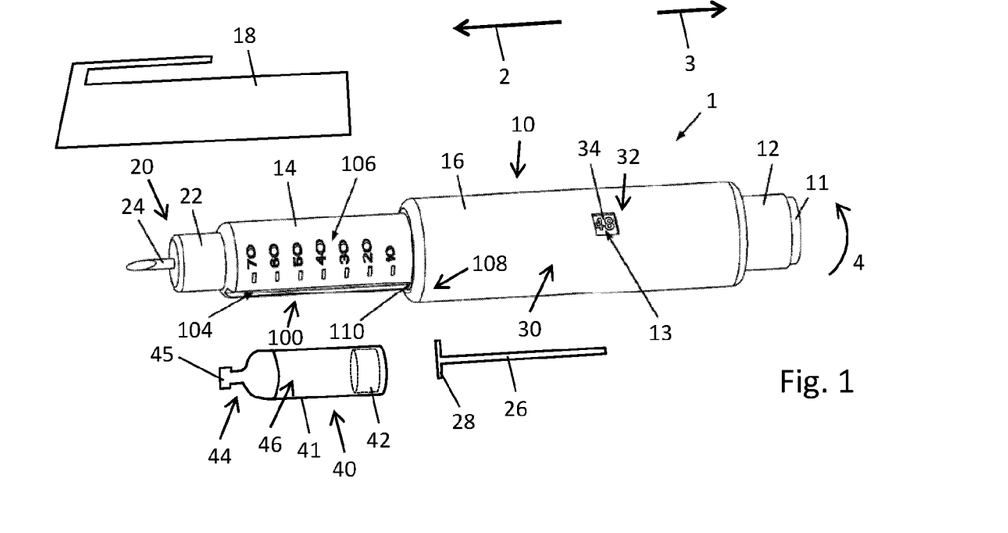
FIG. 1 illustrates one example of a drug delivery device equipped with a mechanically implemented post-dispensing indicator in an initial configuration, i.e. before a dose of the medicament has been delivered.

The drug delivery device 1 as illustrated in FIG. 1 is implemented as an injection device, in particular as a pen-type injector. The drug delivery device comprises an elongated housing 10. Towards a distal direction 2 the drug delivery device 1 comprises an injection needle 24 configured to puncture biological tissue. Towards the opposite proximal direction 3, hence at a proximal end the drug delivery device 1 comprises a dose dial 12 and a trigger 11. The drug delivery device 1 is implemented as a pen-type injector. The housing 10 comprises a proximal housing part, typically denoted as body 16.

The housing 10 further comprises a cartridge holder 14 forming or constituting a distal housing part. The cartridge holder 14 is configured to accommodate or to receive a medicament container 40. The container 40 may comprise a cartridge. The container 40 comprises a barrel 41, e.g. made of a vitreous material. The barrel is sealed in proximal direction 3 by a piston 42 moveable inside the tubular-shaped barrel 41. The piston 42 typically comprises an elastomeric stopper made from an elastomeric sealing material. The opposite, hence the distal end of the container 40 is characterized by a head portion 44. It may further comprise a stepped down shoulder portion and a neck portion. The head portion 44 typically comprises a pierceable seal 45.

With the narrowing shoulder portion and/or with the head portion 44 the barrel 41 is typically in axial or longitudinal abutment with the distal end of the cartridge holder 14. The distal end of the cartridge holder 14 typically comprises a through opening to receive a proximal tip of an injection needle 24 of a needle assembly 20. On the distal end of the cartridge holder 14 there is typically provided a threaded socket configured to engage with a correspondingly threaded needle hub 22 of the needle assembly 20. In this way and upon mounting of the needle assembly 20 the cartridge holder 14 the proximal tip of the injection needle 24 enters the through opening of the cartridge holder 14 and pierces the pierceable seal 45 of the medicament container 40.

The drug delivery device 1 further comprises a drive mechanism 30 which is not illustrated in greater detail here. The drive mechanism 30 typically comprises an elongated piston rod 26 and is extending in longitudinal direction of the housing 10. A distal end of the piston rod 26 is provided with a radially enlarged pressure piece 28. The pressure piece 28 is configured to abut in longitudinal direction with a proximal thrust receiving surface of the piston 42. As the piston rod 26 is urged in distal direction 2 it exerts a pressure to the piston 42 thereby moving the piston 42 relative to the barrel 41 in distal direction 2. As a consequence, the liquid medicament 46 contained inside the barrel 41 is expelled through the injection needle 24 and is hence delivered into biological tissue when the distal end of the injection needle 24 has pierced respective tissue.

With some injection devices 1 there is provided a scale drum 32 inside the body 16. The scale drum 32 is typically provided with numerous dose indicating indicia 34, such as numbers being illustrative of a size of a dose currently set. The scale drum 32 may be rotatable inside the housing 10, typically inside the body 16. The scale drum 32 may be axially or longitudinally confined or the scale drum 32 may be threadedly engaged with the body 16. In the latter case the scale drum 32 is subject to a combined rotational and longitudinal movement relative to the body 16 when it rotates. The dose dial 12 and the proximal end of the body 16 is rotatable at least in a dose incrementing direction 4, e.g. clockwise relative to the body 16. In this way, a user may dial or set a dose of variable size.

Once a dose has been set, a respective dose size will show up in a dosage window 13 through which a dedicated portion of the scale drum 32 is visible or discernible. As a dose of desired or intended size has been dialed the user may depress the trigger 11 thereby initiating and/or controlling a dose delivery operation.

With some drug delivery devices 1 the dial 12 is also rotatable in a dose decrementing direction, hence in a direction opposite to the dose incrementing direction 4. Dialing the dial in a dose decrementing direction allows to correct or to reduce the size of a dose that has been set.

The drug delivery device 1 further comprises a protective cap 18 configured to cover the cartridge holder 14. The protective cap 18 may mechanically engage with at least one of the cartridge holder 14 and the body 16. For use of the drug delivery device 1 the protective cap 18 has to be removed. Thereafter, the needle assembly 20 can be mounted to the distal end of the cartridge holder 14 for use of the drug delivery device 1.

The drug delivery device 1 further comprises a post-dispensing indicator 100. The post-dispensing indicator 100 is configured to visually illustrate a size of a dose previously delivered. The post-dispensing indicator 100 comprises a track 104 extending along the elongation or longitudinal direction of the drug delivery device. The track 104 is located on the outside of the housing 10, e.g. on the outside of the cartridge holder 14. The track 104 may also be located inside the housing 10 as long as it is visible from outside the drug delivery device 1. Hence, the post-dispensing indicator 100, e.g. its track 104 may also be located inside the housing 10, wherein a respective portion of the housing 10 is transparent or translucent.

The post-dispensing indicator 100 further comprises an indicator member 110 that is moveable along the track 104. The position of the indicator member 110 along the track 104 is indicative of a size of a dose previously delivered by the drug delivery device. The post-dispensing indicator 100 further comprises a first scale 106 along the elongation of the track 104. The first scale 106 may be provided with numerous scale steps that are arranged equidistantly along the elongation of the track 104. The indicator member 110 may comprise a slider 114 and may be provided with a pointer 112.

Figure 2:
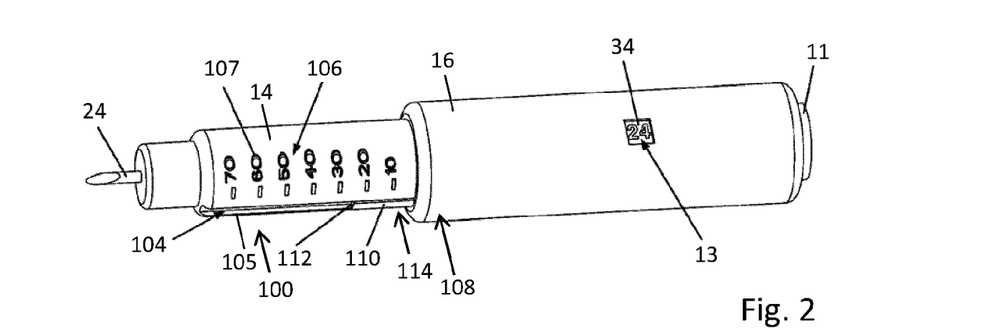
FIG. 2 shows the drug delivery device of FIG. 1 during delivery of a dose and FIG. 3 shows the drug delivery device of FIG. 1 after delivery of the dose has been completed.
Figure 3:
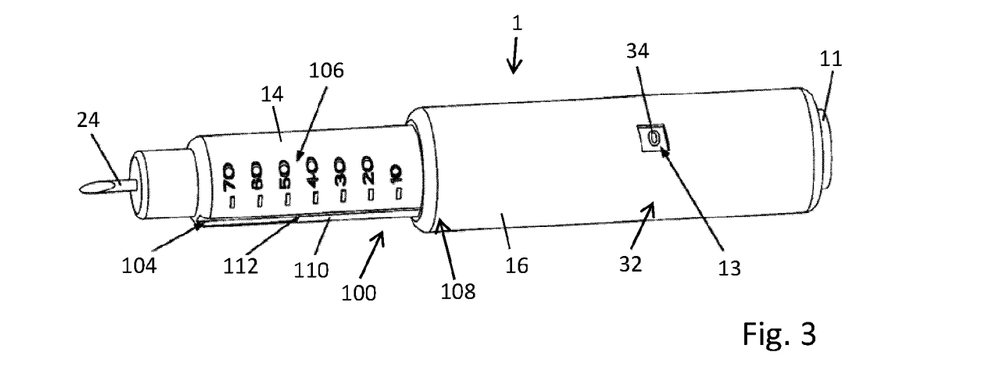
Figure 4:
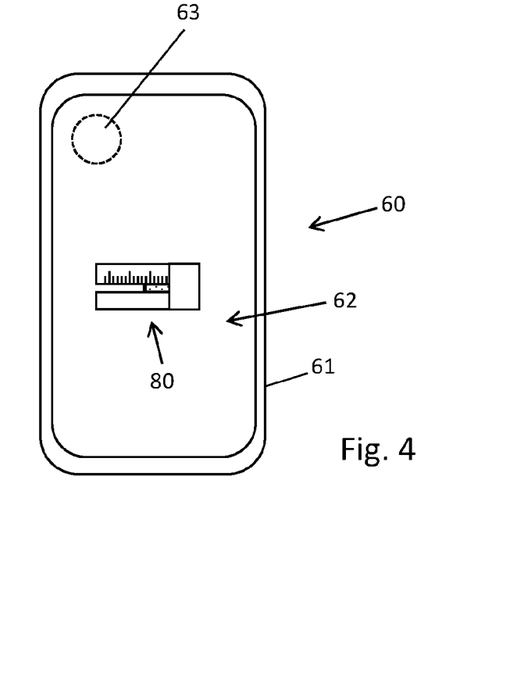
FIG. 4 is indicative of an electronic device configured to capture an image of the post-dispensing indicator of the drug delivery device.

In the illustrated example of FIGS. 1-3 the track 104 comprises a radial groove on the outside surface of the cartridge holder 14. During dialing of a dose as illustrated in FIG. 1 the indicator member 110 is entirely located inside the body 16 of the drug delivery device 1. As a dose is dispensed or delivered the indicator member 110 slides along the track 104 and starts to move along the groove 105 in distal direction 2. In the example of FIG. 1 a dose of 48 units has been dialed or set. During delivery of the dose of the medicament the scale drum 32 is subject to a rotation towards the zero dose configuration as illustrated in FIG. 3.

In FIG. 2, the scale drum shows that half of the dose has been dispensed. Accordingly, a number of 24 units shows up in the dosage window 13. Accordingly, the indicator member 110 has moved along a length of the track 104 that corresponds to the size of the dose already delivered. In the example of FIGS. 1-3 the indicator member 110 is provided with the pointer 112. The position of the pointer 112 along the track 104 and its position relative to the scale 106 indicates the size of the dose already delivered. The scale 106 comprises various numerals 107 along the track 104. When the pointer 112 aligns with a respective numeral 107 the position of the pointer 112 is indicative of a respective dose size.

In the final configuration, hence after completion of delivery of the dose, the scale drum 32 has returned into an initial configuration. Accordingly, a number zero shows up in the dosage window 13 thus indicating that the device has returned into an initial or idle state. Accordingly, the post-dispensing indicator 100, in particular its indicator member 110 has moved to a position of the track 104, where the pointer 112 points to a portion of the scale 106 that corresponds to the size of the dose actually delivered, e.g. to a dose size of 48 units.

The post-dispensing indicator 100 may be implemented similar or identical to the mechanical dose expelled indicator as disclosed in document WO 2015/091818 A1, the entirety of which being incorporated herein by reference. There, a mechanical implementation of the post-dispensing indicator is described in greater detail. Generally, there may be various mechanical implementations of the post-dispensing indicator 100. In the presently illustrated example the track 104 is an elongated and straight-shaped track extending parallel to the elongation of the housing 10. With other examples not being illustrated here the track 104 comprises a helical or circular shape and the indicator member 110 is shaped accordingly.

In the presently illustrated example the body 16 comprises or provides a cover 108 for the indicator member 110. In a dose ready position as illustrated in FIG. 1, i.e. before delivery of the dose, the indicator member 110 is located completely inside the opaque body 16. It is covered by the cover 108. As the dose is delivered and hence during delivery of the dose the indicator member 110 starts to protrude from the body 16 and extends into the groove 105 as illustrated in FIGS. 2 and 3.

With further examples of the post-dispensing indicator 100 the track 104 may be located in or on the body 16.

Figure 12:
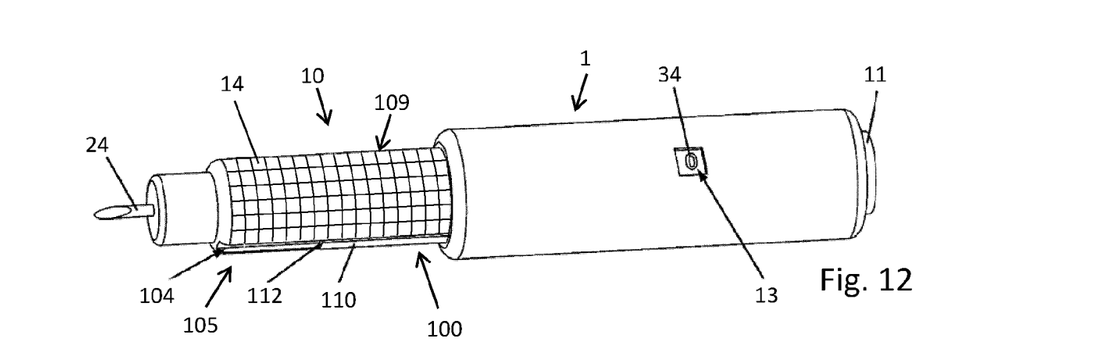
FIG. 12 shows an example of a visible pattern on the outside of the housing of the drug delivery device allowing and supporting compensation of a perspective distortion of the captured image.

In FIG. 12 one example of the drug delivery device 1 is illustrated that provides a rather precise recognition of the position of the configuration of the post-dispensing indicator 100. There, a visible pattern 109 is either overlapping with the post-dispensing indicator 100 or is located adjacent to the post-dispensing indicator 100. For instance, the cartridge holder 14 is provided with a visible pattern 109. The pattern 109 may comprise a two-dimensional regular pattern, such as a matrix pattern on the outside surface of the cartridge holder 14. The pattern 109 may be located adjacent to the track 104. It may adjoin the groove 105. This allows and provides a precise image processing and configuration recognition of the post-dispensing indicator in an image captured by a camera. The visible pattern 109 further provides a compensation of a perspective distortion of the image, e.g. in the event when the perspective of the captured image would lead to a perspective enlargement of the post-dispensing indicator 100.

Generally the post-dispensing indicator 100 can be implemented in various different ways. In the detailed illustration according to FIG. 7 there is provided a recessed longitudinal groove 105 forming or constituting the track 104 on the outside of the housing 10 of the drug delivery device 1.

Figure 7:
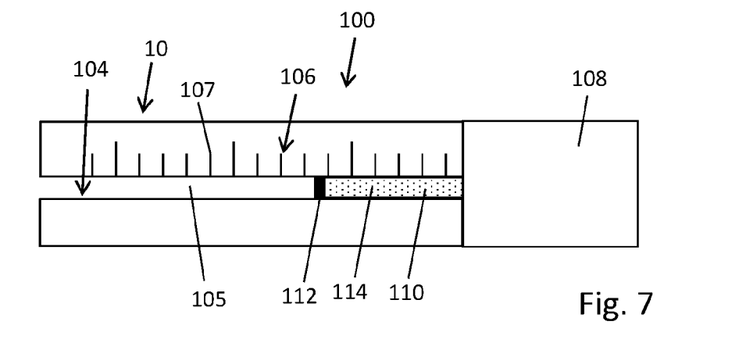
FIG. 7 is an enlarged view of one example of the mechanically implemented post-dispensing indicator.

In a pre-delivery position a dedicated portion or an end of the indicator member 110, that may be provided with the pointer 112 is located underneath a cover 108. In the post-dispensing or post-delivery position as illustrated in FIG. 7 the indicator member 110 has moved along the track 104. Accordingly, it moves along the scale 106 extending along the elongation of the track 104. The pointer 112 located on an outside surface of the indicator member 110 aligns along the scale 106 and points towards a respective scale step or scale item, such as a number being indicative of the size of the dose recently set and delivered.

The post-dispensing indicator 100 may be resettable, hence, the indicator member 110 may be retractable or displaceable back into the dose ready position as illustrated in FIG. 1.

A reset operation may be conducted and implemented as described in document WO 2015/091818 A1.

Figure 8:
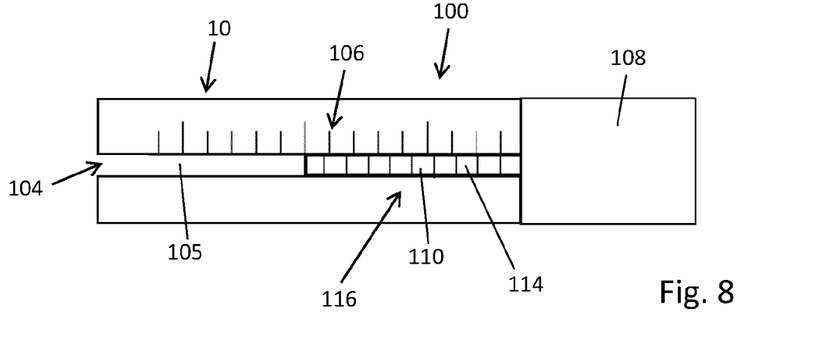
FIG. 8 shows another example of the post-dispensing indicator.

In the further example as illustrated in FIG. 8 the indicator member 110 is provided with a second scale 116. Both, the first scale 106 provided on or in the housing 10 and the second scale 116 provided on or integrated into the indicator member 110 comprise numerous discrete scale steps. As illustrated in FIG. 8 the number of scale steps per unit length of the second scale 116 is smaller than the number of scale steps per unit length of the first scale 106. In this way a nonius-type scale can be provided providing and allowing for a rather precise recognition of the position of the indicator member 110 along the track 104.

Typically, the scale steps of the first scale 106 are equidistant. The scale steps of the second scale 116 are also equidistant. For instance and when the first scale 106 comprises 10 discrete scale steps per unit length the second scale 116 comprises one scale step less per unit length.

Figure 9:
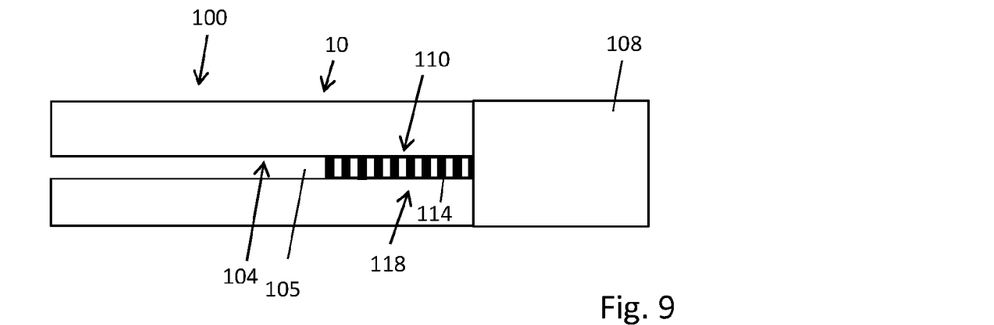
FIG. 9 shows a further example of the post-dispensing indicator and FIG. 10 shows a further example of the post-dispensing indicator.

In the further example of FIG. 9 the indicator member 110 is provided with a code 118 on an outside surface. Here, the indicator member 110 comprises a slider 114 slidably arranged on or in the track 104 or groove 105. In a pre-delivery or dose ready position the entirety of the indicator member 110 is covered by a cover 108. It is hence non-visible from outside the drug delivery device 1. During or after delivery of the dose the indicator member 110 moves along the track 104 and enters the groove 105. The further the indicator member 110 moves along the track 104 the more of the outside surface of the indicator member 110 becomes discernible as it protrudes from the cover 108 in the direction of the elongation of the track 104. Typically, the cover 108 adjoins a longitudinal end of the track 104. As soon as the indicator member 110 moves in a dose increasing direction along the track 104 the indicator member 110 protrudes and moves away from the cover 108.

The entirety of the indicator member 110 is provided with a visible code 118 on an outside surface. The more the indicator member 110 becomes visible the more of the code 108 is discernible and recognizable in an image 80 of the post-dispensing indicator 100. The code 118 may comprise a digital code. The code 118 may comprise a gray code. The code 118 may comprise a two-digit, three-digit, four-digit, five-digit, six-digit, seven-digit or eight-digit digital code. The code 118 is encoded along the elongation of the track 104 and hence along the elongation of the indicator member 110. The length of the code 118 discernible in an image 80 of the post-dispensing indicator 100 is directly indicative of the size of a dose previously dispensed.

Figure 10:
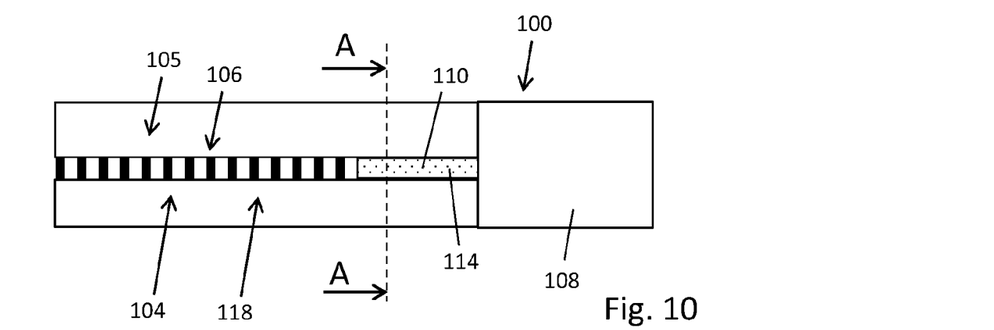
Figure 11:
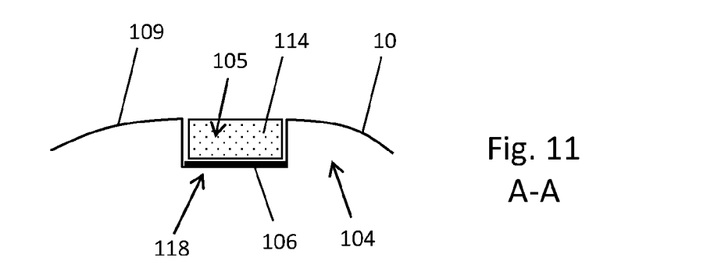
FIG. 11 is a partial cross-section through the post-dispensing indicator according to FIG. 10

In FIGS. 10 and 11 a further example of the post-dispensing indicator 100 is illustrated. Here, it is the bottom of a groove 105 of the track 104 that is provided with a code 118. In a pre-dispensing configuration, in which the indicator member 110 is located offset from the track 104 the entirety of the code 118 is visible in an image 80. As the indicator member 110 and hence the slider 114 enters the groove 104 it covers at least a portion of the code 118 located underneath. Here, the indicator member 110 and/or its slider 114 is opaque so as to cover a respective portion of the digital code 118 located underneath as the indicator member 110 moves along the track 104. Also here, the digital code 118 is encoded along the elongation of the track 104. A maximum code length is indicative of a pre-delivery configuration. As the indicator member 110 reaches an opposite end position, in which the entirety of the code 118 is covered by the indicator member the configuration of the post-dispensing indicator 100 represents a maximum size of a dose.

Figure 5:
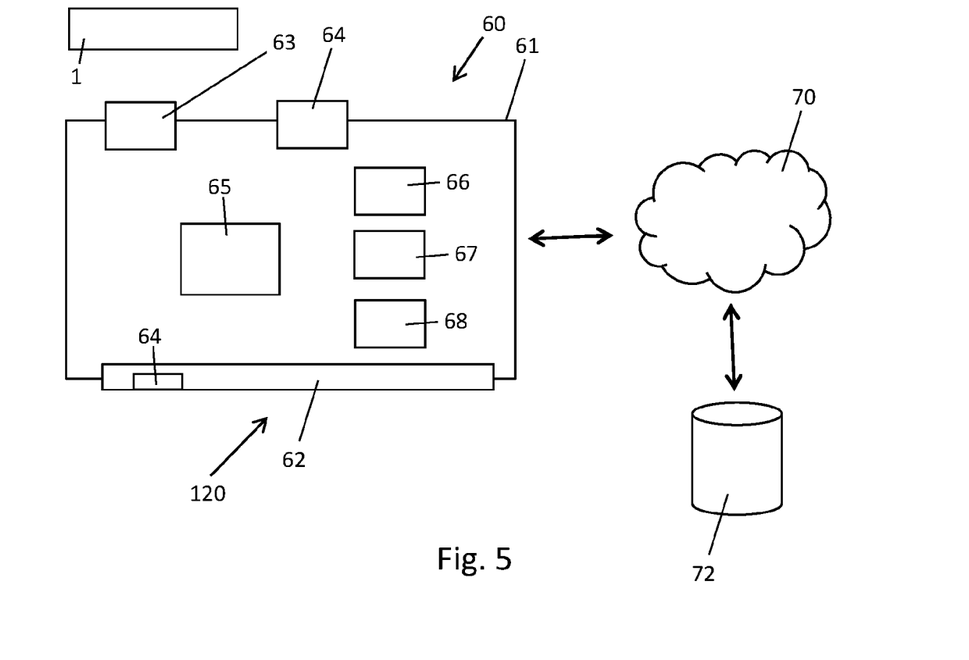
FIG. 5 shows a block diagram of the information acquisition system comprising an electronic device.

In FIG. 5 a block diagram of an information acquisition system 120 is schematically illustrated. The information acquisition system 120 comprises a drug delivery device 1 configured for delivery of a dose of a medicament and comprising a post-dispensing indicator 100 as described above in connection with any one of the FIG. 1-3 or 7-12. The information acquisition system 120 comprises at least one electronic device 60. The electronic device 60 may comprise a smartphone, a tablet computer or a smart watch. Typically, the electronic device 60 is a portable electronic device.

The electronic device 60 comprises a housing 61 and further comprises at least a camera 63 and a processor 65. In addition the electronic device 60 comprises a storage 66, a clock generator 67 and a communication interface 68. Optionally, the electronic device 60 further comprises a display 62 and one or several inputs 64. The display 62 may be implemented as a touch-sensitive display. Insofar, an input 64 may be integrated into the display 62. The storage 66, the clock generator 67, the communication interface 68 and the processor 65 may be integrated into a single chip or in a common integrated circuit. The camera 62 is configured to capture an image 80 of the drug delivery device 1, in particular of the post-dispensing indicator 100 of the drug delivery device 1. The captured image 80 may be reproduced on the display 62. Image capturing can be triggered by the user via the input 64.

The processor 65 of the electronic device 60 is configured and operable to process the image 80 captured by the camera 62. The processor 65 may be operable to recognize the configuration of the post-dispensing indicator 100 in the captured image 80. The processor 65 may be further operable to derive a dose size from the recognized configuration of the post-dispensing indicator. The processor 65 may be further operable to assign a dose size recognized or derived from the configuration of the post-dispensing indicator 100 with a timestamp provided by the clock generator 67. The processor 65 is then further capable to store the timestamp together with the dose size in the storage 66.

In this way a dosing history of the drug delivery device 1 can be monitored, recorded and stored in the storage 66.

Upon request and via the communication interface 68 the data stored in the storage 66 can be made available to further electronic devices 72, such as a database or a data center. Communication and transfer of data may be conducted via a network 70. Insofar, the communication interface 68 of the electronic device 60 may comprise a wireless communication interface, e.g. implemented as an RF transceiver or NFC transceiver.

With some examples the capability of the processor 65 may be limited to receive data or signals from the camera 63 and to store respective data or signals directly in the storage 66. Additionally or alternatively, the processor 65 may be configured to transmit signals received from the camera 63 directly to the communication interface 68 for transmitting respective data to a further external electronic device 72. Then, image processing, configuration recognition of the post-dispensing indicator 100, deriving of a dose size from the recognized configuration and assigning of the dose size with a timestamp and/or storing the dose size with the timestamp in a storage may be conducted by the external electronic device 72.

The portable electronic device 60 comprises the minimum requirement of capturing of an image 80 of the post-dispensing indicator 100 and to transmit respective camera signals or respective image data to an external electronic device 72. Optionally, captured image data may be buffered in the storage 66. With other examples the electronic device 60 provides at least one of image processing, configuration recognition of the post-dispensing indicator 100 in the image, deriving of a dose size from the recognized configuration, assigning the dose size with a timestamp and storing the dose size together with the timestamp in the storage 66.

With other examples the processor 65 may be configured and operable to conduct a pre-processing of the image and/or a pre-recognition of the configuration of the post-dispensing indicator. At least one of the further steps of image processing, configuration recognition, dose size derivation, dose size assigning with a timestamp and storing of the dose size together with the timestamp may then be conducted by the external electronic device.

Figure 6:
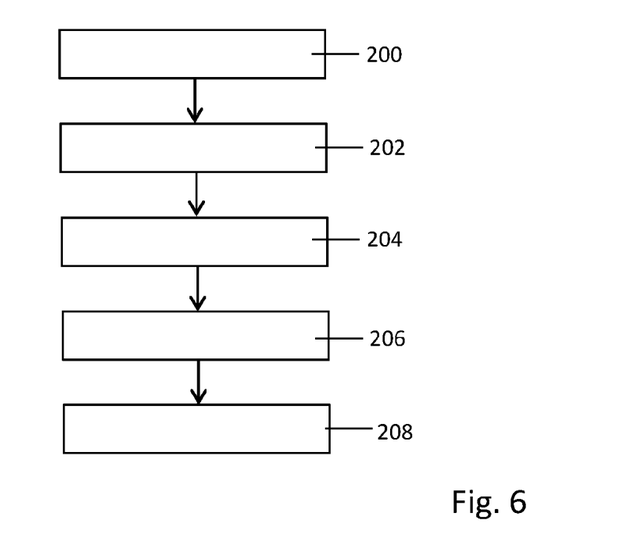
FIG. 6 shows a flowchart of the method of acquiring delivery information.

In FIG. 6 the numerous method steps for acquiring delivery information of the drug delivery device 1 by making use of the electronic device 60 and/or by making use of the information acquisition system 120 are illustrated. Here and in a first step 200 an image 80 of the post-dispensing indicator 100 is captured by the camera 63 of the portable electronic device 60. Thereafter, in step 202, the captured image 80 is processed. In particular, the configuration of the post-dispensing indicator 100 is recognized by the processor 65, e.g. making use of particular pattern recognition schemes or routines. In the further step 204, a dose size is derived from the recognized configuration of the post-dispensing indicator. Here, a position of the recognized pointer 112 relative to the scale 106 is assigned to or is translated into a dose size.

Thereafter, in step 206, the dose size derived in step 204 is assigned or associated with a timestamp. The timestamp is provided by the clock generator 67. Thereafter, in step 208, the dose size together with the timestamp is stored in the storage 66.

LIST OF REFERENCE NUMBERS 1 drug delivery device
2 distal direction 3 proximal direction
4 dose incrementing direction
10 housing
11 trigger
12 dose dial
13 dosage window
14 cartridge holder
16 body
18 protective cap
20 needle assembly
22 needle hub
24 injection needle
26 piston rod
28 pressure piece
30 drive mechanism
32 scale drum
34 dose indicia
40 container
41 barrel
42 piston
44 head portion
45 seal
60 electronic device
61 housing
62 display
63 camera
64 input
65 processor
66 storage
67 clock generator
68 communication interface
70 network
72 database
100 post dispensing indicator
104 track
105 groove
106 scale
108 cover
107 numeral
109 pattern
110 indicator member
111 body
112 pointer
114 slider
116 scale
118 code

The invention claimed is:

1. A method of acquiring delivery information of a drug delivery device configured for delivery of a dose of a medicament, the drug delivery device comprising a housing configured to accommodate a medicament container, a drive mechanism configured to operably engage with the medicament container to deliver the dose of the medicament and a post-dispensing indicator that is mechanically implemented and which comprises an indicator member movable along a track, wherein a position of the indicator member along the track and being visible from outside the drug delivery device is indicative of the size of the dose previously delivered by the drug delivery device, the method comprising
capturing of an image of the post-dispensing indicator after delivery of the dose;
processing of the image and recognizing the configuration of the post-dispensing indicator in the image, wherein recognizing the configuration of the post-dispensing indicator comprises recognizing of the position of the indicator member along the track in the image;
deriving of a dose size from the recognized configuration of the post-dispensing indicator;
assigning the dose size with a timestamp; and
storing the dose size with the timestamp in a storage.

2. The method of claim 1, wherein one of the track and the indicator member comprises a first scale and wherein another one of the track and the indicator member comprises a pointer or a second scale cooperating with the first scale and wherein recognizing the configuration of the post-dispensing indicator comprises recognizing of the position of the pointer or second scale along the first scale in the image.

3. The method of claim 1, wherein one of the track and the indicator member comprises a visual code which is encoded along the track and wherein recognizing the configuration of the post-dispensing indicator comprises recognizing of at least a portion of the visual code in the image.

4. The method of claim 3, wherein the visual code is successively covered or is successively revealed as the indicator member is moved along the track and wherein a visible length of the visual code along the track is indicative of the dose size of the dose previously delivered and wherein recognizing the configuration of the post-dispensing indicator comprises recognizing or determining of the visible length of the visual code in the image.

5. The method of claim 1, wherein the housing comprises a visible pattern overlapping with the post-dispensing indicator or located adjacent to the post-dispensing indicator and wherein processing of the image or recognizing the configuration of the post-dispensing indicator comprises compensating of a perspective distortion of the image on a basis of the visible pattern in the image.

6. The method of claim 1, wherein the drug delivery device comprises a dosage window configured to visualize dose indicia being indicative of a size of a dose actually set and wherein processing of the image or recognizing the configuration of the post-dispensing indicator includes recognizing of dose indicia in the image.

7. The method of claim 6, wherein recognizing the configuration of the post-dispensing indicator in the image is deactivated as long as the dose indicia recognized in the image do not match with a predefined dose indicium.

8. A computer program adapted to execute the method of claim 1 when implemented in a processor of an electronic device the computer program is configured to execute operations comprising:
capturing of an image of the post-dispensing indicator after delivery of the dose;
processing of the image and recognizing the configuration of the post-dispensing indicator in the image, wherein recognizing the configuration of the post-dispensing indicator comprises recognizing of the position of the indicator member along the track in the image;
deriving of a dose size from the recognized configuration of the post-dispensing indicator;
assigning the dose size with a timestamp; and
storing the dose size with the timestamp in a storage.

9. The computer program of claim 8, wherein the operations further comprise: successively revealing a visual code as the indicator member is moved along a track.

10. An electronic device for acquiring delivery information of a drug delivery device, the drug delivery device comprising a housing configured to accommodate a medicament container, a drive mechanism configured to operably engage with the medicament container to deliver a dose of a medicament, and a post-dispensing indicator that is mechanically implemented and which comprises an indicator member movable along a track, wherein a position of the indicator member along the track and being visible from outside the drug delivery device is indicative of the size of the dose previously delivered by the drug delivery device, the electronic device comprising:
- a camera for capturing of an image of the post-dispensing indicator of the drug delivery device; and
- a processor operable to process the image and operable to recognize the configuration of the post-dispensing indicator in the image, wherein recognizing the configuration of the post-dispensing indicator comprises recognizing of the position of the indicator member along the track in the image, and wherein the processor is further operable to derive a dose size from the recognized configuration of the post-dispensing indicator, to assign the dose size with a timestamp and to store the dose size with the timestamp in a storage.

11. The electronic device of claim 10, wherein the post-dispensing indicator comprises an indicator member movable along a track and wherein a position of the indicator member along the track is indicative of the size of the dose previously delivered, wherein recognizing the configuration of the post-dispensing indicator comprises recognizing of the position of the indicator member along the track in the image.

12. An information acquisition system for acquiring delivery information of the drug delivery device, the information acquisition system comprising:
- a drug delivery device configured for delivery of a dose of a medicament, the drug delivery device comprising a housing configured to accommodate a medicament container, a drive mechanism configured to operably engage with the medicament container to deliver the dose of the medicament, and a post-dispensing indicator that is mechanically implemented and which comprises an indicator member movable along a track, wherein a position of the indicator member along the track and being visible from outside the drug delivery device is indicative of the size of the dose previously delivered, by the drug delivery device; and
- the electronic device of claim 10.

13. The information acquisition system of claim 12, wherein the post-dispensing indicator comprises an indicator member movable along a track and wherein a position of the indicator member along the track is indicative of the dose size of the dose previously delivered, wherein the processor of the electronic device is operable to recognize the position of the indicator member along the track in the image.

14. The information acquisition system of claim 13, wherein one of the track and the indicator member comprises a first scale and wherein another one of the track and the indicator member comprises a pointer or a second scale cooperating with the first scale and wherein the processor of the electronic device is operable to recognize the position of the pointer or second scale along the first scale in the image.

15. A drug delivery device configured for delivery of a dose of a medicament, the drug delivery device comprising:
- a housing configured to accommodate a medicament container,
- a drive mechanism configured to operably engage with the medicament container to deliver the dose of the medicament,
- a post-dispensing indicator that is mechanically implemented, the post-dispensing indicator comprising an indicator member movable along a track, wherein a position of the indicator member along the track is indicative of the dose size of the dose previously delivered,
- wherein one of the track and the indicator member comprises a first scale and wherein the other one of the track and the indicator member comprises a pointer or a second scale cooperating with the first scale and wherein a configuration of the post-dispensing indicator is recognizable by recognizing of the position of the pointer or second scale along the first scale in an image of the post-dispensing indicator of the drug delivery device.

16. The drug delivery device of claim 15 further comprising a medicament container containing a medicament and arranged inside the housing.

17. The drug delivery device of claim 15, wherein one of the track and the indicator member comprises a visual code which is encoded along the track and wherein recognizing the configuration of the post-dispensing indicator comprises recognizing of at least a portion of the visual code in the image, wherein the visual code is successively covered or is successively revealed as the indicator member is moved along the track and wherein a visible length of the visual code along the track is indicative of the dose size of the dose previously delivered and wherein recognizing the configuration of the post-dispensing indicator comprises recognizing or determining of the visible length of the visual code in the image.

18. The drug delivery device of claim 15, wherein the housing comprises a visible pattern overlapping with the post-dispensing indicator or located adjacent to the post-dispensing indicator and wherein processing of the image or recognizing the configuration of the post-dispensing indicator comprises compensating of a perspective distortion of the image on a basis of the visible pattern in the image.

* * * * *